(12) United States Patent
Ligatti et al.

(10) Patent No.: US 10,298,391 B2
(45) Date of Patent: May 21, 2019

(54) SYSTEMS AND METHODS FOR GENERATING SYMMETRIC CRYPTOGRAPHIC KEYS

(71) Applicants: Jay Ligatti, Tampa, FL (US); Cagri Cetin, Lutz, FL (US); Shamaria Engram, Dover, FL (US); Dmitry Goldgof, Lutz, FL (US)

(72) Inventors: Jay Ligatti, Tampa, FL (US); Cagri Cetin, Lutz, FL (US); Shamaria Engram, Dover, FL (US); Dmitry Goldgof, Lutz, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/135,856

(22) Filed: Sep. 19, 2018

(65) Prior Publication Data

US 2019/0036691 A1     Jan. 31, 2019

Related U.S. Application Data

(62) Division of application No. 16/030,550, filed on Jul. 9, 2018.

(60) Provisional application No. 62/529,715, filed on Jul. 7, 2017.

(51) Int. Cl.
*H04L 29/06* (2006.01)
*H04L 9/08* (2006.01)
*H04L 9/32* (2006.01)

(52) U.S. Cl.
CPC .......... *H04L 9/0869* (2013.01); *H04L 9/0827* (2013.01); *H04L 9/0866* (2013.01); *H04L 9/3242* (2013.01); *H04L 63/0435* (2013.01)

(58) Field of Classification Search
CPC . H04L 9/0869; H04L 63/0435; H04L 9/0827; H04L 9/3242
See application file for complete search history.

(56) References Cited

U.S. PATENT DOCUMENTS

| | | |
|---|---|---|
| 6,871,192 B2 | 3/2005 | Fontana et al. |
| 8,650,393 B2 | 2/2014 | Kato et al. |
| 8,817,984 B2 * | 8/2014 | Miller ........................ H04L 9/16 380/255 |
| 9,712,503 B1 | 7/2017 | Ahmed et al. |
| 2002/0019933 A1 | 2/2002 | Friedman et al. |
| 2002/0035687 A1 | 3/2002 | Skantze |
| 2003/0167391 A1 | 9/2003 | Al-Ali |

(Continued)

OTHER PUBLICATIONS

Aparna et al., "Cryptographic Key Generation based on Contextual Information: A Review," International Journal of Computer Applications, 2016, 134(15).

(Continued)

*Primary Examiner* — Nelson Giddins
(74) *Attorney, Agent, or Firm* — Michael Best & Friedrich LLP

(57) ABSTRACT

A system for generating symmetric cryptographic keys for communications between hosts. Hosts use associated devices to generate secret keys. Each key is generated based on a static seed and a dynamic seed. The dynamic seed is created from sensor data or auxiliary data. The secret key allows host machines to encrypt, or decrypt, plaintext messages sent to, or received from, other host machines.

10 Claims, 6 Drawing Sheets

(56) References Cited

U.S. PATENT DOCUMENTS

| | | | |
|---|---|---|---|
| 2005/0175182 A1 | 8/2005 | Ueno et al. | |
| 2006/0174349 A1 | 8/2006 | Cronce et al. | |
| 2006/0256961 A1* | 11/2006 | Brainard | G06F 21/31 380/44 |
| 2008/0063190 A1 | 3/2008 | Campagna et al. | |
| 2009/0245516 A1 | 10/2009 | Ravikiran | |
| 2010/0027788 A1* | 2/2010 | Tkacik | H04L 63/06 380/46 |
| 2011/0126005 A1* | 5/2011 | Carpenter | G06F 13/385 713/158 |
| 2011/0293094 A1 | 12/2011 | Os et al. | |
| 2011/0307699 A1* | 12/2011 | Fielder | H04L 63/123 713/172 |
| 2012/0155636 A1 | 6/2012 | Muthaiah | |
| 2012/0155645 A1 | 6/2012 | Prochaska et al. | |
| 2013/0003972 A1 | 1/2013 | Kang et al. | |
| 2013/0014227 A1 | 1/2013 | Larson et al. | |
| 2013/0019109 A1* | 1/2013 | Kang | G06F 21/10 713/193 |
| 2013/0042112 A1 | 2/2013 | Spector | |
| 2013/0051552 A1* | 2/2013 | Handschuh | G06F 21/602 380/44 |
| 2013/0073850 A1 | 3/2013 | Zaverucha | |
| 2013/0124854 A1 | 5/2013 | Kato et al. | |
| 2013/0301829 A1 | 11/2013 | Kawamura et al. | |
| 2013/0311781 A1 | 11/2013 | Wang et al. | |
| 2013/0318358 A1 | 11/2013 | Wang et al. | |
| 2014/0025944 A1* | 1/2014 | Maletsky | G06F 21/57 713/150 |
| 2014/0075207 A1 | 3/2014 | Kato et al. | |
| 2014/0105394 A1* | 4/2014 | Abildgren | G06F 21/606 380/255 |
| 2014/0108824 A1* | 4/2014 | Nagai | H04L 9/0877 713/193 |
| 2014/0223188 A1 | 8/2014 | Nagai et al. | |
| 2014/0229746 A1 | 8/2014 | Nagai et al. | |
| 2014/0247938 A1 | 9/2014 | Desmicht et al. | |
| 2015/0100841 A1 | 4/2015 | Gizdarski | |
| 2015/0106616 A1 | 4/2015 | Nix | |
| 2015/0227738 A1 | 8/2015 | Katoh | |
| 2015/0263854 A1 | 9/2015 | Sakumoto et al. | |
| 2015/0341785 A1 | 11/2015 | Young et al. | |
| 2016/0048692 A1 | 2/2016 | Fielder | |
| 2016/0065372 A1* | 3/2016 | Kolesnikov | H04L 63/0428 713/168 |
| 2016/0117262 A1* | 4/2016 | Thom | H04L 9/0822 713/189 |
| 2016/0285635 A1 | 9/2016 | Kolesnikov et al. | |
| 2017/0034167 A1 | 2/2017 | Figueira | |
| 2017/0063535 A1* | 3/2017 | Brown | G09C 5/00 |
| 2017/0085374 A1 | 3/2017 | Chen | |
| 2017/0188250 A1 | 6/2017 | Stevens et al. | |
| 2017/0195298 A1* | 7/2017 | Brand | H04L 63/0435 |
| 2017/0208045 A1* | 7/2017 | Huh | H04L 9/0822 |
| 2017/0289735 A1* | 10/2017 | Rajapaksa | H04W 12/04 |
| 2017/0294054 A1 | 10/2017 | Rosenbaum | |
| 2018/0076955 A1 | 3/2018 | Shields et al. | |
| 2018/0083785 A1* | 3/2018 | Shields | H04L 9/3239 |
| 2018/0176198 A1* | 6/2018 | Rajapaksa | H04L 63/061 |
| 2018/0248691 A1 | 8/2018 | Henderson et al. | |
| 2018/0248692 A1 | 8/2018 | Henderson et al. | |

OTHER PUBLICATIONS

Barker et al., "Recommendation for Key Management Part 1: General," NIST Special Publication 800-57, Part 1, Revision 4, 2016. Available at http://nvlpubs.nist.gov/nistpubs/SpecialPublications/NIST.SP.800-57pt1r4.pdf.

Bernstein, "Introduction to Post-quantum Cryptography," Post-quantum Cryptography, 2015, pp. 1-14.

Blanchet et al., "ProVerif 1.96: Automatic Cryptographic Protocol Verifier, User Manual and Tutorial," 2016. Available at <http://prosecco.gforge.inria.fr/personal/bblanche/proverif/manual.pdf>.

Diffie et al., "New Directions in Cryptography," IEEE transactions on Information Theory, 1976, vol. 22, pp. 644-654.

Doherty et al., "Dynamic Symmetric Key Provisioning Protocol (DSKPP)," <https://tools.ietf.org/html/rfc6063> 2010.

Dworkin, "SHA-3 Standard: Permutation-Based Hash and Extendable-Output Functions," Information Technology Laboratory, National Institute of Standards and Technology, 2015, Available at <http://nvlpubs.nist.gov/nistpubs/FIPS/NIST.FIPS.202.pdf>.

Feistel, "Cryptography and Computer Privacy," Scientific American, 1973, vol. 228, pp. 15-23.

FIPS PUB 140-2 "Security Requirements for Cryptographic Modules," Information Technology Laboratory, National Institute of Standards and Technology, 2001. Available at <http://csrc.nist.gov/publications/fips/fips140-2/fips1402.pdf>.

Gentry, "Certificate-Based Encryption and the Certificate Revocation Problem," International Conference on the Theory and Applications of Cryptographic Techniques, 2003, pp. 272-293.

Hao et al., "J-PAKE: Authenticated Key Exchange without PKI," Transactions on Computational Science XI, 2010, pp. 192-206.

Kocher et al., "Differential Power Analysis," Annual International Cryptology Conference, 1999, pp. 388-397.

Lin et al., "A Password Authentication Scheme with Secure Password Updating," Computers & Security, 2003, vol. 22, pp. 68-72.

Mathur et al., "Proximate: Proximity-based Secure Pairing Using Ambient Wireless Signals," Proceedings of the 9th International Conference on Mobile Systems, Applications, and Services, 2011, pp. 211-224.

Mathur et al., "Radio-telepathy: Extracting a Secret Key from an Unauthenticated Wireless Channel," Proceedings of the 14th ACM International Conference on Mobile Computing and Networking, 2008, pp. 128-139.

PCI Security Standards Council, "Payment Card Industry (PCI) Data Security Standard, v3.2," (2016) Available at <https://www.pcisecuritystandards.org>.

Premnath et al., "Secret Key Extraction from Wireless Signal Strength in Real Environments," Transactions of Mobile Computing, 2013, vol. 12, pp. 917-930.

Ravi et al., "Tamper Resistance Mechanisms for Secure Embedded Systems," 17th International Conference on VLSI Design, 2004, pp. 605-611.

Shor, "Algorithms for Quantum Computation: Discrete Logarithms and Factoring," 35th Annual Symposium on Foundations of Computer Science, 1994, pp. 124-134.

Suh et al., "Aegis: Architecture for Tamper-Evident and Tamper-Resistant Processing," Proceedings of the 17th annual international conference on Supercomputing, 2003, pp. 160-171.

Vassilev, "Annex A: Approved Security Functions for FIPS PUB 140-2, Security Requirements for Cryptographic Modules. Information Technology Laboratory, National Institute of Standards and Technology," 2016. Available at <http://csrc.nist.gov/publications/fips/fips140-2/fips1402annexa.pdf>.

Wang et al., "Survey on Channel Reciprocity Based Key Establishment Techniques for Wireless Systems," Wireless Networks, 2015, vol. 21, pp. 1835-1846.

Webster et al., "On the Design of S-Boxes," Conference on the Theory and Application of Cryptographic Techniques, 1985, pp. 523-534.

Wikepedia.com, "RSA SecurityID," <https://en.wikipedia.org/wiki/RSA_SecurID> webpage available as early as Sep. 13, 2006.

Wilhelm et al., "Secret Keys from Entangled Sensor Motes: Implementation and Analysis," Proceedings of the Third ACM Conference on Wireless Network Security, 2010, pp. 139-144.

International Search Report and Written Opinion for Application No. PCT/US2018/041098 dated Sep. 21, 2018 (14 pages).

* cited by examiner

SYSTEMS AND METHODS FOR GENERATING SYMMETRIC CRYPTOGRAPHIC KEYS

CROSS-REFERENCE TO RELATED APPLICATIONS

This application is a divisional of U.S. patent application Ser. No. 16/030,550, filed on Jul. 9, 2018, which is a non-provisional of and claims the benefit of U.S. Provisional Application No. 62/529,715, filed on Jul. 7, 2017, the contents of which are incorporated herein by reference.

BACKGROUND OF THE INVENTION

Cryptography enables communication of confidential information in untrusted environments. To ensure confidentiality, information is often transmitted in the form of ciphertext, generated with ciphers using cryptographic keys.

Symmetric-key cryptography is often the preferred method of secret communication due to its performance advantages over asymmetric, or public-key, cryptography.

A fundamental problem with symmetric-key cryptography is how to initially generate and establish a key agreed upon between the communicators. Typically, asymmetric cryptography is used for this purpose. However, asymmetric techniques rely on slow and complex operations, such as arithmetic exponentiation and querying certificate authorities for public keys. Moreover, asymmetric operations are often not quantum resistant, as efficient algorithms exist for quantum computers to break asymmetric ciphers like RSA and asymmetric key exchanges like Diffie-Helman.

Prior-art methods for generating and establishing symmetric keys, while avoiding asymmetric cryptography, also have significant shortcomings. For example, many techniques exist for generating keys based on the "principle of reciprocity". These key-generation (keygen) techniques involve two devices sensing the same, or similar, wireless signals, to obtain sensed data. These keygen techniques then use a process called reconciliation to remove the differences between the signals sensed on different devices, operating in different locations. The reconciled signals then act as a symmetric key. However, basing keys on only sensed wireless signals creates several problems, including: the techniques are not always available because certain environmental conditions may limit the ability of sensors to sense the signals, the techniques may produce keys with insufficient entropy, and the techniques are vulnerable to attackers located near the sending or receiving hosts, who may sense similar signals and generate the same key.

Hence, what is needed in the art are systems and methods for automatically generating and establishing symmetric cryptographic keys without basing keys on only sensed wireless signals, and without sending any data, except for ciphertext, between hosts. By only sending ciphertext data between hosts, the systems and methods avoid certain active attacks, such as breaking Diffie-Helman key exchanges with man-in-the-middle techniques, as well as certain passive attacks, such as breaking Diffie-Helman key exchanges by observing the public keys sent between hosts and solving the discrete-log problem, which can be solved efficiently with quantum algorithms.

SUMMARY OF THE INVENTION

Features of a methodology according to embodiments of the present invention can (1) establish confidential communication channels by generating symmetric-cryptographic keys limited to particular times, geographies, devices, or sets of devices, (2) initially generate a secret key without sending any data between hosts, (3) only transmit ciphertexts between hosts, and (4) never store secret keys except temporarily, in volatile memory, during the brief window between generation of a key and encryption/decryption.

The methodology described herein has as its applications any communications that could benefit from symmetric-key cryptography, including, for example, communications between: (1) mobile phones and cell towers, (2) VOIP (voice over IP), or VPN (virtual private network), clients and servers, (3) IM (instant messaging), or email, clients and servers, (4) smart thermostats, or other devices in the smart-grid, and power-grid routers, (5) financial institutions (banks, credit unions, brokerage firms, payment devices, etc.), (6) credit cards and credit-card readers, (7) child monitors (cameras or microphones) and their parents' devices, (8) radio transmitters and receivers using frequency hopping; the generated keys may determine the channel at which to operate, (9) Internet-of-things devices, and (10) any other networked devices.

Embodiments of the invention include the following components:
Devices capable of accessing static seeds guaranteeing that:
Generated keys do not rely (only) on sensed data, generated keys contain sufficient entropy, and pairs of devices, or sets of devices, can generate keys that are secret from other devices.
Devices also capable of forming dynamic seeds from one or more sensed signals or auxiliary data.
A key-generation (keygen) function that inputs a static seed and a dynamic seed and outputs a cryptographic key.
Protocols for communications between host machines and their associated devices. These new protocols include processes for receivers to determine the identities, and agree on the dynamic seeds, of messages' senders, in order to decrypt their messages.

Six illustrative, high-level communication protocols are described herein. The first three protocols describe embodiments in which devices generate keys on demand and provide those keys to host machines, so host machines can perform encryption and decryption operations. The latter three protocols describe embodiments in which devices generate keys on demand but then use those keys to perform encryption and decryption operations for the host machines.

In one particular embodiment, the invention provides a system for generating symmetric cryptographic keys. The system comprises a first host machine and a first device in communication with the first host machine. The first device is configured to receive a message from the first host machine indicating an intent to communicate with a second host machine, generate a secret key based on a static seed and a dynamic seed, the dynamic seed created from sensor data or auxiliary data, encrypt an identifier for the first host machine, or its associated device, using the static seed, to generate an encrypted identifier message, and transmit the encrypted identifier message and the secret key to the first host machine to enable the first host machine to encrypt a plaintext message using the secret key and to transmit the encrypted identifier message and the encrypted plaintext message to the second host machine.

In another particular embodiment, the invention provides a system for generating symmetric cryptographic keys. The system comprises a first host machine and a first device in communication with the first host machine. The first device is configured to receive a message from the first host machine indicating an intent to communicate with a second host machine and a plain text message to be encrypted, generate a secret key based on a static seed and a dynamic seed, the dynamic seed created from sensor data or auxiliary data, encrypt an identifier for the first host machine, or its associated device, using the static seed, to generate an encrypted identifier message, encrypt the plaintext message using the secret key, and transmit the encrypted identifier message and the encrypted plaintext message to the first host machine.

Other aspects of the invention will become apparent by consideration of the detailed description and accompanying drawings.

DETAILED DESCRIPTION

Figure 1:
FIG. 1 illustrates a flow diagram for generating symmetric keys. Secret keys ($K_{AB}$) depend on a given static seed ($S_{AB}$) and dynamic seed (D).

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The invention relates to communication between two or more host machines ("hosts"). Host machines are any devices communicating or attempting or willing to communicate. Examples of host machines include laptops, personal computers, smartphones, tablet computers, smartwatches, smart apparel, and other Internet-of-things devices. In the descriptions of embodiments in the present disclosure, when a host is described as communicating with another host, it is to be understood that the communications can be generalized to communications between additional hosts, using techniques known in the art, such as making communications broadcast or multicast rather than unicast, or running multiple instances of the described communication protocols.

In the present disclosure, a host H is described as communicating not only with other hosts, but also with a "device" that performs cryptographic operations for host H. Such a device is said to serve, and be associated with, that particular host. It is to be understood that these "devices" may be separate from, embedded in, or part of, the host machines they serve. For example, a device serving host H may plug into a port, such as a USB port, on host H. Alternatively, a device serving host H may be embedded into, and share a processor with, host H. There may be no physical, or hardware, separation between a host machine and its associated device. A device serving host H may just be a process, thread, procedure, routine, subroutine, function, etc. running on host H. Devices may also be shared between hosts, and there may be a "device service" for performing the required cryptographic operations for multiple hosts.

In general, embodiments of the invention are related to a system for generating symmetric cryptographic keys for communications between hosts. Hosts use associated devices to generate secret keys. Each key is generated based on a static seed and a dynamic seed. The dynamic seed is created from sensor data or auxiliary data. The secret key allows host machines to encrypt, or decrypt, plaintext messages sent to, or received from, other host machines.

Each of the components in the system is next addressed in detail.

Static Seeds

Each device can access a set of static secrets, one secret for each device, or group of devices, in a set of devices. Each of these "static seeds" is a constant or slowly changing value. Devices may store static seeds in an electronic memory, such as nonvolatile flash memory or a protected Trusted Platform Module (TPM) memory segment. Alternatively, devices may not store static seeds in electronic memory, for example by storing them on tape or not storing them at all. In this latter case, a device may use a sensor to read the desired static seed whenever needed. For example, a static seed may be encoded as the temperature in a climate-controlled building. A device need not store this static seed in memory, for it can always access the desired value by using a thermometer to read the temperature.

As an example, suppose a set of devices contains only two devices, called A and B, with Device A serving Host A and Device B serving Host B. Then Device A may have access to two static seeds, one called $S_{AB}$, used for communicating with Device B, and another called $S_{AA}$, used for communicating with itself (i.e., for encrypting "data at rest", which remains on Host A). Device B may also have access to two static seeds, one being the same $S_{AB}$ accessible to Device A and the other being $S_{BB}$ (where $S_{BB}$ is used for Device B to communicate with itself, i.e., to encrypt data for Host B that will remain on Host B). A device capable of communicating with the n−1 other devices in its set of devices may have access to n static seeds, each indexed by the ID of the device that can access that same static seed.

Static seeds serve several purposes. One purpose of static seeds is to avoid the problems with techniques based on the "principle of reciprocity", in which attackers may obtain secret keys by sensing the same data as the communicators. Another purpose of static seeds is to guarantee that generated keys are based on sufficient entropy, to prevent brute-force attacks in which all possible keys are tried. Regardless of how much entropy exists in dynamic seeds, the static seeds can be made to contribute arbitrary and sufficient entropy to the generated key. Static-seed entropy may, for example, be produced with a Cryptographically Secure Pseudo-Random Number Generator (CSPRNG) and encoded on devices at time of manufacture. Alternatively, static seeds may be agreed upon through traditional techniques, including existing key generation and key-exchange protocols. Static seeds may occasionally be updated through similar means, for example when devices are added to, or removed from, a set of devices.

Dynamic Seeds

Dynamic seeds are a means for contributing entropy or freshness to generated keys based on values that change more rapidly than static seeds but are nonetheless accessible to all the devices participating in a communication. While static seeds are constant, or slowly changing, and therefore may be reused through multiple key generations, dynamic seeds change more quickly, and each key generation is based on a fresh, or refreshed, dynamic seed.

Returning to the example of Devices A and B serving Hosts A and B, where Devices A and B can both access the same static seed $S_{AB}$, every generation of a new symmetric key for communication between Hosts A and B may be based on the same static seed $S_{AB}$ but different dynamic seeds. That is, if Device A is generating a new key to enable Host A to communicate with Host B, Device A may base the new key on (1) the same static seed $S_{AB}$ it has used in the past to generate keys for communications between Hosts A and B, and (2) a fresh dynamic seed, for example the current time.

Devices are capable of forming dynamic seeds from one or more sensed signals or auxiliary data. Examples of sensed signals that may be used to form a dynamic seed include the current time, a pseudorandom number such as a nonce (which is typically computed based in part on the sensed time), location, temperature, acceleration, brightness, or ambient noise. Examples of auxiliary data on which dynamic seeds may depend include (1) timestamps encoding times in the past or future, for example to encode the time at which another device generated a key in the past, or to encode a time at which a key should expire in the future; (2) geographic ranges, for example to encode the maximum range over which a key should be accessible; or (3) sensor-channel characteristics, for example to encode a particular channel into which a device must tune its sensors, in order to obtain the correct sensed signals for the dynamic seed. The illustrative communication protocols will further clarify the use of auxiliary data for generating keys.

As an example of devices using sensed signals to form dynamic seeds, Devices A and B may both be located near each other, on the same floor of a building lacking climate controls. During keygen, Devices A and B may sense and use the current temperature as a dynamic seed. Such a dynamic seed can only be reliably obtained by devices that (1) are in the immediate geographic area of Devices A and B, and (2) read the temperature at about the same time as Devices A and B read the temperature. Hence, this dynamic seed is geographically and temporally limited. Temporally, the dynamic seed "expires" when the temperature changes, because reading the current temperature is not a perfectly reliable indicator of past (or future) temperatures. When keys are generated based on such geographically and temporally limited dynamic seeds, the keys themselves are geographically and temporally limited.

It should be understood that temperature sensing is only provided as an illustrative example of dynamic-seed agreement between devices. Other phenomena, natural or artificial, may produce signals that devices entering communication may read and use as dynamic seeds for the keygen process.

Basing secret keys on dynamic seeds serves several purposes, including prevention of replay attacks (dynamic seeds ensure that generated keys change) and ensuring forward secrecy of communications (obtaining one secret key does not leak other secret keys).

Key Generation

FIG. 1 illustrates a flow diagram for generating cryptographic keys based on static and dynamic seeds. It may be desirable to implement the keygen function, which receives static seeds and dynamic seeds as inputs and then outputs a secret key, as a cryptographic hash function with high avalanche effect, such as SHA-3, to ensure that entirely new keys are generated even when static seeds do not change.

Communication Protocols

Six high-level communication protocols are described herein, to illustrate various embodiments. In the first three protocols presented in FIGS. 2-4, devices generate keys on demand and provide those keys to host machines, so host machines can perform encryption and decryption operations. In the last three protocols presented in FIGS. 5-7, devices generate keys on demand and perform encryption and decryption operations for the host machines.

Encryption and decryption operations described in the illustrative protocols may be performed using any known symmetric-key ciphers, including for example AES or one-time pads. It will be understood and appreciated by those skilled in the art of cryptography that the present invention enables implementation of one-time pads, as a new secret key (of length equal to the message being transmitted) may be generated for each message transmitted between hosts. The encryption of a message M using key K is written $\{M\}_K$.

Additional elements may be added to the protocols shown, to implement additional features. For example, communications could occur between more than two hosts using techniques known in the art for generalizing two-host communications to n-host communications, including using seeds or keys agreed upon, or sensed, by more than two hosts, transmitting messages in a broadcast or multicast manner, or concurrently running multiple instances of the protocols. As another example, additional timestamps or nonces may be added to the messages shown in the protocols, to provide additional protections against replay attacks. As yet another example, message authentication codes (MACs) may be added to the messages shown in the protocols, to provide additional guarantees of authenticity and integrity. As yet another example, messages may be sent on top of existing protocols, such as IP, UDP, TCP, HTTP, TLS, HTTPS, etc.

Conversely, auxiliary data X, seen in FIGS. 2-7, may be removed from the protocols shown, for those embodiments in which devices participating in the communication can form dynamic seeds without access to the auxiliary data. Although the illustrative communication protocols include auxiliary data, it should be understood that auxiliary data is an optional element of the communication protocols, included for embodiments in which one or more devices need the auxiliary data to form the correct dynamic seed.

It should also be understood, in the communication protocols, that "messages" simply represent data flowing between entities. For example, the protocols include a host machine transmitting, to its associated device, a message containing a host or device identifier; such message transmission represents data flowing from the host to its associated device. In some embodiments, such as those in which a device D is a process, thread, procedure, routine, subroutine, or function executing on the host H that D serves, a "message" "transmitted" from H to D and "received" by D may not be a message sent over a network or through a communication port, but instead may be initialization parameters, function arguments, or any other data flow from H to D. The same principle applies to all communications described herein; messages simply indicate a flow of data. A message transmitted by entity E1 and received by entity E2, where each entity may be a host or device, indicates a flow of data from E1 to E2.

Communication Protocol 1

Figure 2:
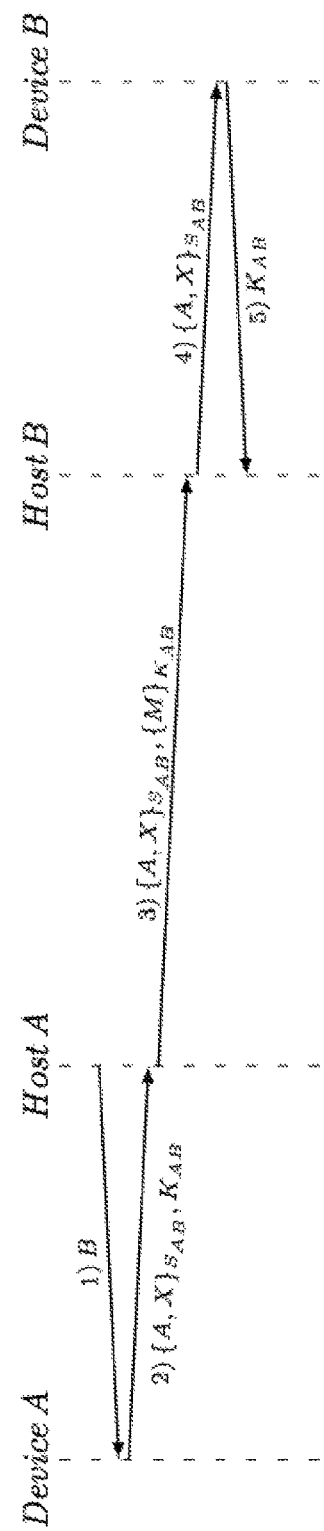
FIG. 2 illustrates a first communication protocol.

This is an example where Host A is associated with Device A and wants to communicate with a Host B that is associated with Device B. FIG. 2 summarizes the operation of Communication Protocol 1. Detailed descriptions of the five communications shown in FIG. 2 follow.

1. Host A sends Device A an identifier B, referring to Host B or its associated device, to indicate an intent to communicate with Host B.

2. Device A (a) obtains static seed $S_{AB}$ and dynamic seed D. The dynamic seed D may depend on auxiliary data X unknown and not immediately accessible to Device B, possibly in addition to signals that Devices A and B can sense. Thus, Device A may identify particular auxiliary data X, such as a fresh timestamp obtained on Device A and therefore unknown and not immediately accessible to Device B, to use for the current communication's dynamic seed D. As shown in FIG. 2, this auxiliary data X is carried through the communications in the protocol, ultimately arriving at Device B and enabling Device B to use the same data X to generate its local copy of the same dynamic seed D.

(b) generates a secret key $K_{AB}$ from $S_{AB}$ and D (as shown in FIG. 1), (c) encrypts (A,X) using $S_{AB}$ to obtain its ciphertext output, and (d) sends this ciphertext output, $\{A,X\}_{S_{AB}}$, and $K_{AB}$ to Host A.

3. Host A (a) obtains its plaintext message M, (b) encrypts M using $K_{AB}$ to obtain $\{M\}_{K_{AB}}$, and (c) sends $\{A,X\}_{S_{AB}}$ and $\{M\}_{K_{AB}}$ to Host B.

4. Host B sends $\{A,X\}_{S_{AB}}$ to Device B.

5. Device B (a) finds the static seed S such that decrypting $\{A,X\}_{S_{AB}}$ with $S_{AB}$ produces a message of the form (A,X), (b) finds $K_{AB}$ using static seed $S_{AB}$ and the dynamic seed D. Dynamic seed D may be obtained from the auxiliary data X and any additional data accessible to, or capable of being sensed by, Device B. Given the static and dynamic seeds, Device B uses the process shown in FIG. 1 to obtain $K_{AB}$.

(c) sends this $K_{AB}$ to Host B.

After these communications, Host B has $K_{AB}$ and can use it to obtain the plaintext M from the second ciphertext received from Host A (i.e., $\{M\}_{K_{AB}}$).

If at any point in the protocol, a device or host receives an undefined input, including, for example, a reused timestamp in auxiliary data X, then that device or host may signal an error.

Hosts and devices following this protocol may destructively delete keys and keygen data, such as dynamic seeds, immediately after use. Future communications may use freshly generated keys.

Communication Protocol 2

Figure 3:
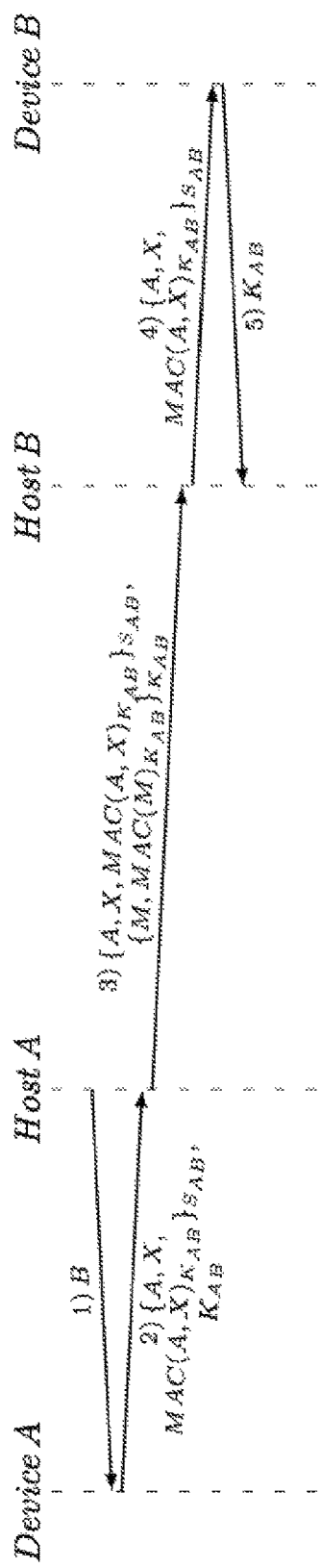
FIG. 3 illustrates a second communication protocol.

The second example communication protocol, shown in FIG. 3, is a variation of the first protocol shown in FIG. 2. The second protocol adds message authentication codes (MACs) to communications. A MAC of data T generated with key K is notated $MAC(T)_K$. MACs provide standard benefits of ensuring authenticity and integrity of messages.

As shown in FIG. 3, the second example communication protocol has Device A generating the MAC of (A,X) using secret key $K_{AB}$. This MAC gets transmitted from Device A to Host A, Host A to Host B, and Host B to Device B, and serves an important additional purpose, beyond the standard purpose of MACs to provide message authenticity and integrity. The additional purpose is to enable Device B to uniquely determine $K_{AB}$, for those embodiments in which multiple candidate secret keys exist.

More specifically, Device B, after obtaining static seed $S_{AB}$ and using $S_{AB}$ to decrypt the message received from Host B to obtain auxiliary data X, may find that multiple candidate dynamic seeds D exist, even for the provided auxiliary data X. For example, due to signal noise, Device B may not be able to obtain dynamic seed D with certainty, instead only obtaining a set of candidate dynamic seeds. In such a case, Device B can use the $MAC(A,X)_{K_{AB}}$ it obtained by decrypting the message received from Host B with static seed $S_{AB}$, to find the correct dynamic seed D. In this case Device B searches the candidate dynamic seeds to find the unique dynamic seed D such that, when input with static seed $S_{AB}$ into the keygen function (shown in FIG. 1), the output key $K_{AB}$ produces a MAC of (A,X) equal to the $MAC(A,X)_{K_{AB}}$ obtained by decrypting the message from Host B.

Communication Protocol 3

Figure 4:
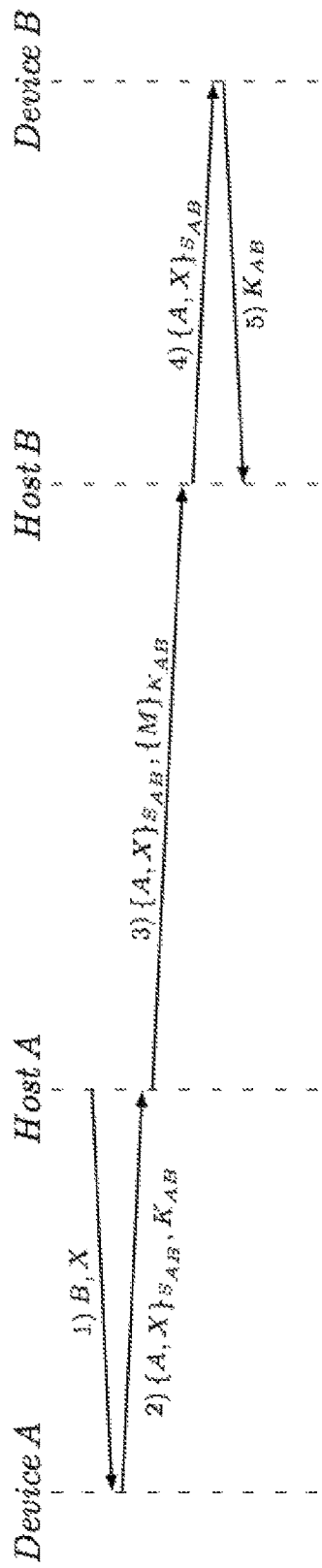
FIG. 4 illustrates a third communication protocol.

The third example communication protocol, shown in FIG. 4, is another variation of the first protocol shown in FIG. 2. The third protocol illustrates Host A determining and sending auxiliary data X to Device A, rather than Device A determining the auxiliary data on its own. This variation illustrated in FIG. 4 is useful for embodiments in which the host machine, or its user, determines desired characteristics of dynamic seeds (and the resulting secret keys). For example, a user of Host A may wish to establish a secure communication channel based on a key only obtainable for the next hour. The one-hour expiration time constitutes auxiliary data X, which Device A may use to determine the dynamic seed on which to base the secret key $K_{AB}$. Device A may, for example, base dynamic seed D on sensed data known to fluctuate little over the next hour, known to be unpredictable after an hour, and known to be capable of being sensed by Device B (assuming Device B has the same auxiliary-data parameter X). As another example, auxiliary data X may encode geographic restrictions on the availability of dynamic seeds (and the resulting secret keys).

Communication Protocols 4-6

Figure 5:
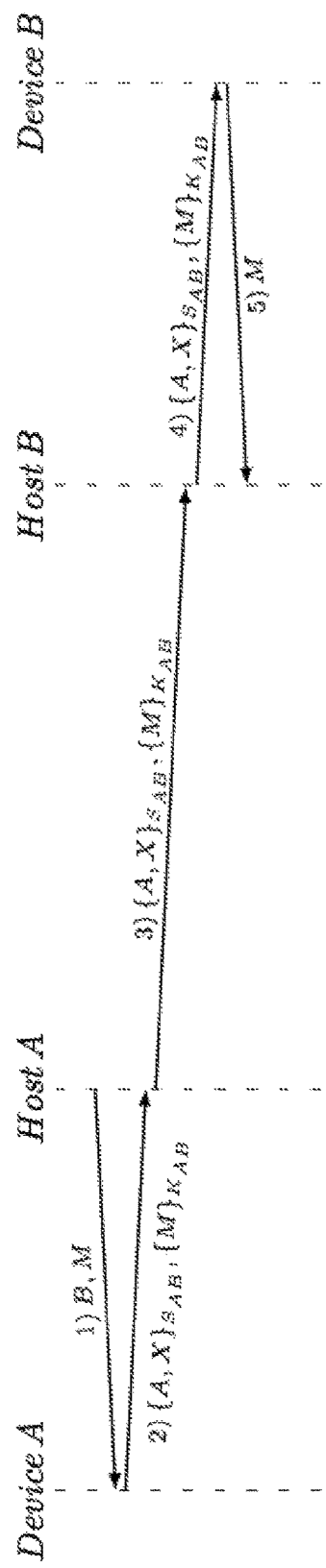
FIG. 5 illustrates a fourth communication protocol.
Figure 6:
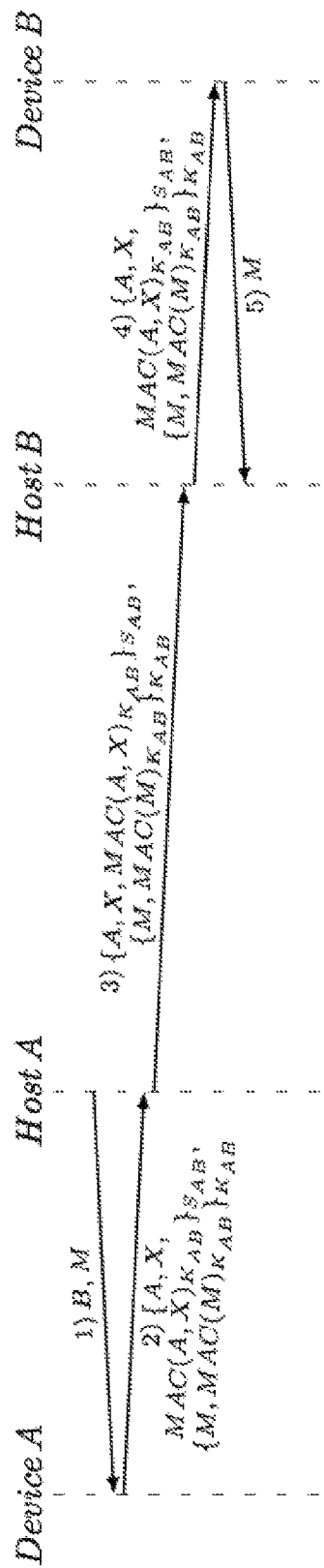
FIG. 6 illustrates a fifth communication protocol.
Figure 7:
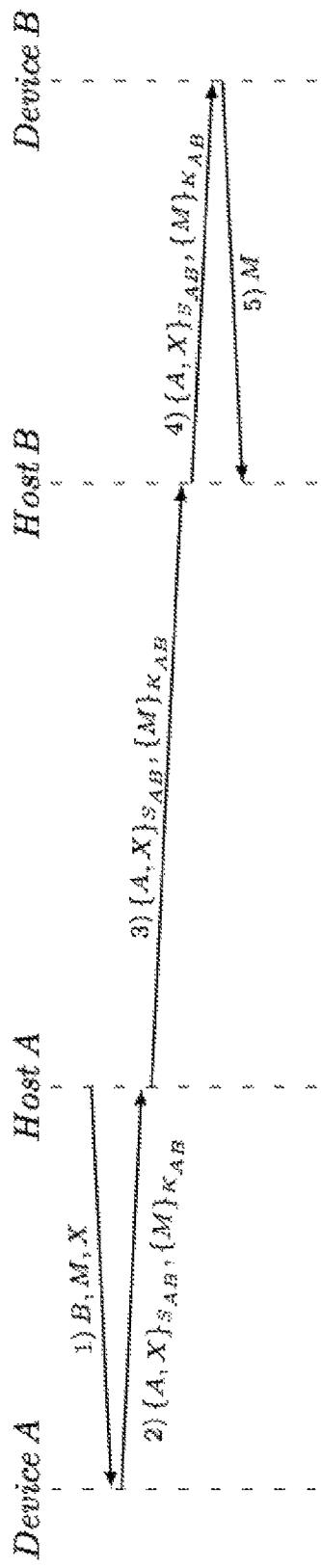
FIG. 7 illustrates a sixth communication protocol.

The first three communication protocols, shown in FIGS. 2-4, are distinguished from the second three communication protocols, shown in FIGS. 5-7, in that devices in the first three protocols never access plaintext messages M. The devices in the first three communication protocols provide a keygen service to hosts, while the devices in the second three communication protocols provide a keygen and encryption/decryption service to hosts. The only substantial differences between the protocols shown in FIGS. 2-4, and those shown in FIGS. 5-7, is that the protocols shown in FIGS. 5-7 have Host A also sending Device A the plaintext M, which Device A encrypts for Host A, and the converse operations occur between Host and Device B.

The primary advantage of Protocols 1-3, shown in FIGS. 2-4, over Protocols 4-6, shown in FIGS. 5-7, is that some users may be skeptical that devices will properly safeguard their plaintexts. Such users may be more comfortable with devices never having access to plaintexts. However, in cases where devices are embedded into host machines (e.g., chips inside mobile phones), or are just processes, threads, functions, etc. executing in host machines, the host machines include the associated devices and must already be trusted (because the hosts could leak plaintexts even without the embedded, associated devices). Therefore, in such cases, any advantage of Protocols 1-3 over Protocols 4-6 is diminished or removed.

The primary advantage of Protocols 4-6 over Protocols 1-3 is that all keys remain inside, and under the control of, the devices. That is, hosts in Communication Protocols 4-6 never have access to the secret key $K_{AB}$ (nor other inputs to the keygen function, such as static and dynamic seeds). This extra control of keys in Protocols 4-6 prevents host machines from misusing or performing dangerous operations on seeds or secret keys, such as archiving them or allowing untrusted parties to access them.

The system architectures having just been disclosed have several desirable properties. The system architectures:

1. Establish confidential communication channels, by generating symmetric-cryptographic keys limited to particular times, geographies, devices, or sets of devices. Confidentiality is ensured by only transmitting ciphertexts between hosts.

2. Only transmit ciphertexts between hosts. Attackers have no plaintext or public keys to analyze.

3. In some embodiments, initially generate a secret key without sending any data between hosts. In all the illustrative communication protocols, the message sender (Host A) uses Device A to generate a secret key, without communicating with Host or Device B.

4. In some embodiments, never store secret keys except temporarily, in volatile memory, during the brief window between generation of a key and encryption/decryption. In all the illustrative communication protocols, devices and hosts may destructively delete secret keys (and keygen data, such as dynamic seeds) immediately after use.

Various features and advantages of the invention are set forth in the following claims.

What is claimed is:

1. A system for generating symmetric cryptographic keys and decrypting messages, the system comprising:
   a first host machine; and
   a first device in communication with the first host machine, the first device configured to
      receive a message from the first host machine indicating an intent to communicate with a second host machine and a plain text message to be encrypted,
      generate a secret key based on a static seed and a dynamic seed, the dynamic seed created from sensor data or auxiliary data,
      encrypt an identifier for the first host machine, or the first device, using the static seed, to generate an encrypted identifier message,
      encrypt the plaintext message using the secret key, and
      transmit the encrypted identifier message and the encrypted plaintext message to the first host machine;
   a second device in communication with the second host machine, the second device configured to
      receive an encrypted identifier message from the second host machine, the encrypted identifier message transmitted by the first host machine to the second host machine,
      decrypt the encrypted identifier message using the static seed used by the first device,
      derive the secret key using the static seed and a dynamic seed, the dynamic seed created from sensor data or from auxiliary data obtained from the decryption of the encrypted identifier message,
      decrypt the plaintext message using the secret key, and transmit the plaintext message to the second host machine.

2. The system of claim 1, wherein the auxiliary data is configured to allow a variable number of data elements and a variable range of values for each data element, and the combination of the number of data elements and range of data values produce a variable range of entropy for the auxiliary data.

3. The system of claim 1, wherein the dynamic seed is based on a combination of auxiliary data and sensor data only available to the first device generating the secret key and the secret key is used by the first host machine to encrypt and decrypt data stored on the first host machine.

4. The system of claim 1, wherein the first device is removably coupled to the first host machine.

5. The system of claim 1, wherein the first device is further configured to generate a message authentication code of an identifier for the first host machine, or the first device, using the secret key, and include this message authentication code in its encrypted identifier message.

6. The system of claim 1, wherein the first host machine is configured to send the first device the auxiliary data used to generate the dynamic seed.

7. The system of claim 1, wherein the second device is removably coupled to the second host machine.

8. The system of claim 1, wherein the static seed is identified by decrypting the encrypted identifier message with a plurality of static seeds to produce a message matching the form of a decrypted identifier message.

9. The system of claim 1, wherein the first device is further configured to generate a message authentication code of an identifier for the first host machine, or the first device, using the secret key, and include this message authentication code in its encrypted identifier message.

10. The system of claim 9, wherein the second device is further configured to
   receive an encrypted identifier message encrypted by the system of claim 9,
   decrypt the encrypted identifier message using the static seed used by the first device,
   identify a plurality of dynamic seeds using a plurality of values for sensor data or the plurality of values for sensor data combined with auxiliary data obtained from the decryption of the encrypted identifier message, and
   identify a correct dynamic seed from the plurality of dynamic seeds that, when input with the static seed to a key generation function, produces a key that generates a message authentication code that matches the message authentication code included in the encrypted identifier message.

* * * * *